(12) United States Patent
Wu

(10) Patent No.: US 7,578,677 B2
(45) Date of Patent: Aug. 25, 2009

(54) SHIELDED SHELL HAVING A SPRING FINGER INTEGRALLY FORMED THEREWITH

(75) Inventor: Chun-Kung Wu, Tu-cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/074,786

(22) Filed: Mar. 5, 2008

(65) Prior Publication Data

US 2008/0220649 A1 Sep. 11, 2008

(30) Foreign Application Priority Data

Mar. 5, 2007 (CN) .......................... 2007 2 0035225
Jun. 19, 2007 (CN) .......................... 2007 2 0038730

(51) Int. Cl.
*H01R 12/00* (2006.01)

(52) U.S. Cl. ....................................................... 439/67

(58) Field of Classification Search ................... 439/67, 439/71, 330, 607, 73
See application file for complete search history.

(56) References Cited

U.S. PATENT DOCUMENTS

| 6,939,172 | B2 * | 9/2005 | Lu ............................. 439/607 |
| 7,261,597 | B2 * | 8/2007 | Li ............................. 439/607 |
| 7,288,003 | B2 * | 10/2007 | Ono et al. ................... 439/607 |
| 2007/0232143 | A1 | 10/2007 | Yang |
| 2007/0238357 | A1 | 10/2007 | Wang |
| 2008/0026626 | A1 | 1/2008 | Ma |

* cited by examiner

*Primary Examiner*—Phuong K Dinh
(74) *Attorney, Agent, or Firm*—Wei Te Chung

(57) ABSTRACT

A shielded shell (1) for interconnecting a camera module to a printed circuit board via a flexible printed circuit board comprises a base wall and a frond wall, a back wall, a left wall and a right wall cooperatively defining a receiving space. A plurality of spring fingers is integrally formed on one of the bottom wall and sidewalls. Therefore, the procedure is simply and a better electrical path is provided between the camera module and the printed circuit board.

3 Claims, 8 Drawing Sheets

SHIELDED SHELL HAVING A SPRING FINGER INTEGRALLY FORMED THEREWITH

BACKGROUND OF THE INVENTION

1. Field of the invention

The present invention relates to a shielded shell, and more particularly to an electronic modular shell for interconnecting an electronic module such as a camera module for use with a cellular phone or the like to an electrical member such as a printed circuit board via a flexible printed circuit board. At least a spring finger is integrally formed on one of a bottom wall and sidewalls of the shielded shell.

2. Description of the Related Art

Conventionally, electronic modules such as a camera module for use with a cellular phone are securely maintained in electrical connection with an electronic member such as a printed circuit board. Therefore, a camera socket which includes a metallic shell is dimensioned to securely position a camera module therein. Consequently, the camera module is electrically connected with the printed circuit board via the shielded connector.

Generally, an electrical connector for the camera module has two types. As disclosed in TW pat No. M283371, an electrical connector comprises an insulating housing, a plurality of terminal contacts secured in the insulating housing, and a top shell surrounding the out surface of the insulating housing. The insulating housing includes a base wall and four sidewalls. The terminal contacts arrange in the sidewalls of the insulating housing, each comprising a retaining section secured in the insulating housing, a tail section extending from an end of the retaining section towards out of the insulating housing so as to attach to the printed circuit board, and a contact engage section extending from the other end of the retaining section towards an opposite sidewall for electrical connecting with pads formed on a bottom of the camera module.

FIG. 8 discloses an another electrical connector 1' for connecting a camera module to a printed circuit board via a flexible printed circuit board, comprising a shielded shell 10' and a spring terminal 30' attached to the shielded shell 10'. The spring terminal 30' is configured as a fishbone and comprises a base 300' and a plurality of contact engaging portions 302' extending from a pair of opposite edges of the base 300' and away therefrom. An end of the base 300' without said contact engaging portions 302' defines a first wing 304' and the first wing 304' extends forwardly from the end of the base 300'. The other end of the base 300' opposite to the first wing 304' defines a second wing 306' extending forward and downward from the edge of said end and away therefrom. The shielded shell 10' is composed of a bottom wall 14' and four sidewalls (not shown) extending upwardly from the edges of the bottom wall 14'. And the bottom wall 14' and the sidewalls together define a receiving space (not labeled) upwardly to accommodate the camera module (not shown). Corresponding to the first and second wing 304', 306', the shielded shell 10' defines a slot 16' to retain the first wing 304' at the connection portion between the bottom wall 14' and the sidewall; an edge of the bottom wall 14' opposite to the slot 16' defines a pair of arms 20' extending forwardly therefrom and away from the edge, therefore a gap 18' is formed between the pair of arms 20' so as to accommodate and hold the second wing 306. Consequently, the shielded shell 10' and spring terminal 30' are attached together via the first and second wings 304', 306' formed on the spring terminal 30' and the slot 16' and the pair of arms 20' formed on the shielded shell 10'.

However, in above structures, there is a key concern that the terminal contacts must assembled with the housing firmly. If not, a steady electrical connection does not provide between the camera module and the printed circuit board. While, in the above structures, the terminal contacts may be apart with the housing/shell when the shielded connector is under excess force.

Thus, there is a need to provide an improved electrical connector that overcomes the above-mentioned problems.

BRIEF SUMMARY OF THE INVENTION

It is an object of the present invention to provide an electrical connector having a spring terminal integrated with a shield shell so as to simply the assemble process and provide a better electrical connection between two electrical elements.

In order to achieve the objective above, a shielded shell in accordance with a preferred embodiment of the present invention is composed of a bottom wall and four sidewalls extending from the periphery of the bottom wall. A plurality of spring fingers is integrally formed on one of the bottom wall and sidewalls. Therefore, an element holding the camera module and transferring the signal of the camera module to a printed circuit board only includes a shielded shell. After said shielded shell is stamped into a fixed shape, the camera module can be fitted therein and it is not easy that the spring finger and the shielded shell be apart.

Other objects, advantages and novel features of the invention will become more apparent from the following detailed description of the present embodiment when taken in conjunction with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like members in the figures and in which:

DESCRIPTION OF PREFERRED EMBODIMENT OF THE INVENTION

In the following detailed description, for purposes of explanation, numerous specific details are set forth in order to provide a thorough understanding of the present invention.

A shielded shell according to the present invention is applicable to an electronic apparatus such as digital cameras, PDAs (Personal Digital Assistants), PCs (Personal Computers), mobile phones or the like. In the preferred embodiment illustrated in FIGS. 1-6, the shielded shell is used in a mobile handset (not shown) for transferring the signal of the camera module to a printed circuit board.

Figure 1:
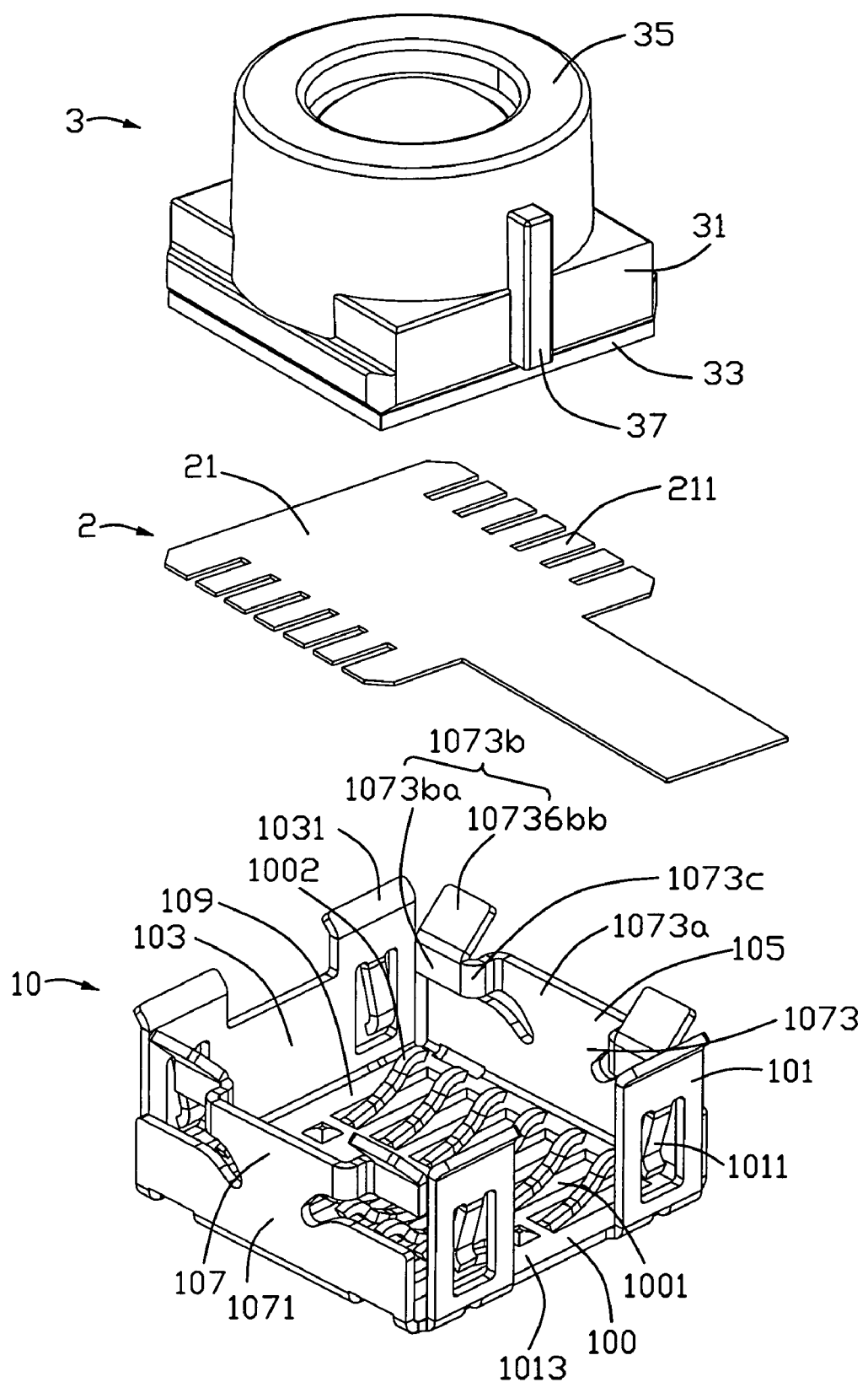
FIG. 1 is a perspective view of a shielded shell according to the first embodiment of the present invention, wherein the flexible printed board and the camera module are shown together.
Figure 2:
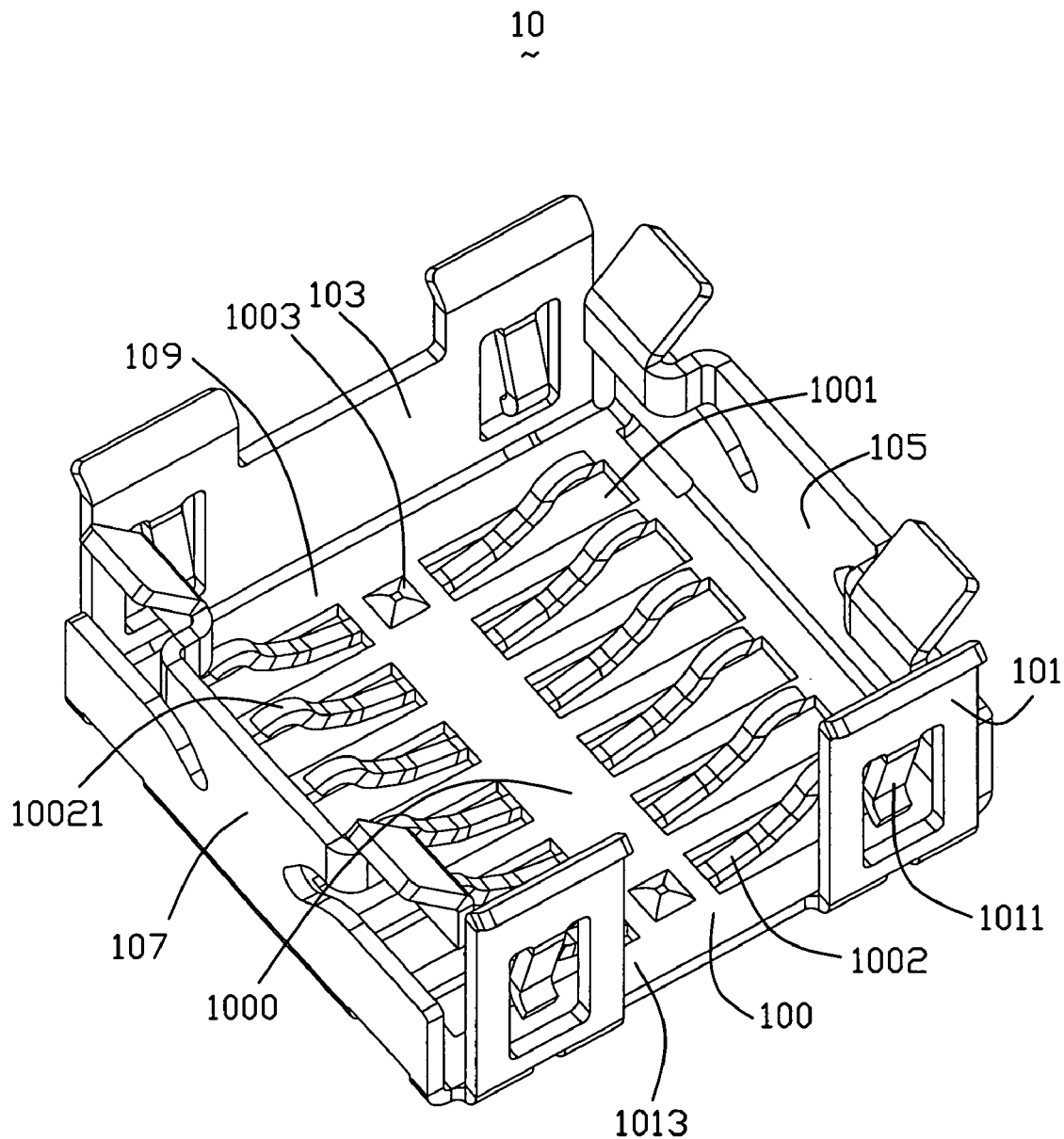
FIG. 2 is a perspective view of the shielded shell of FIG. 1.
Figure 3:
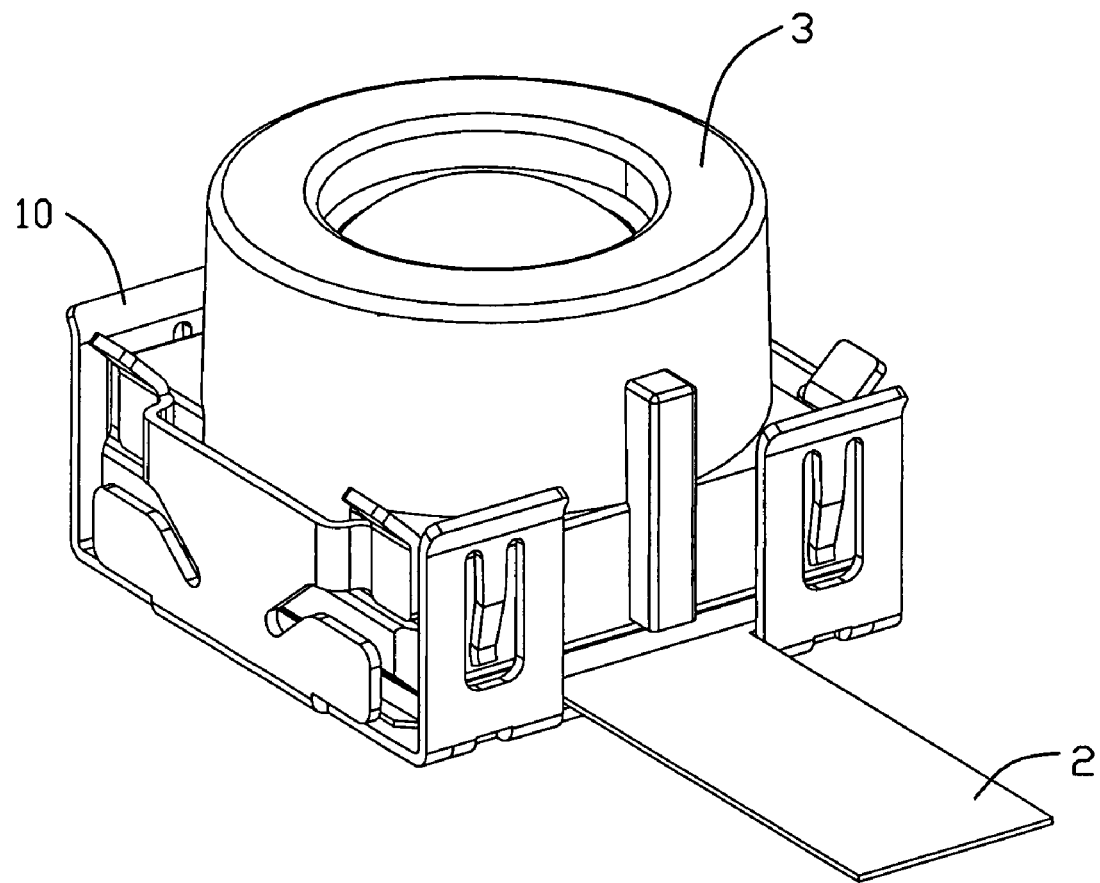
FIG. 3 is a perspective view of a shielded shell of FIG. 1, wherein the flexible printed board and the camera module have be assembled therein.
Figure 4:
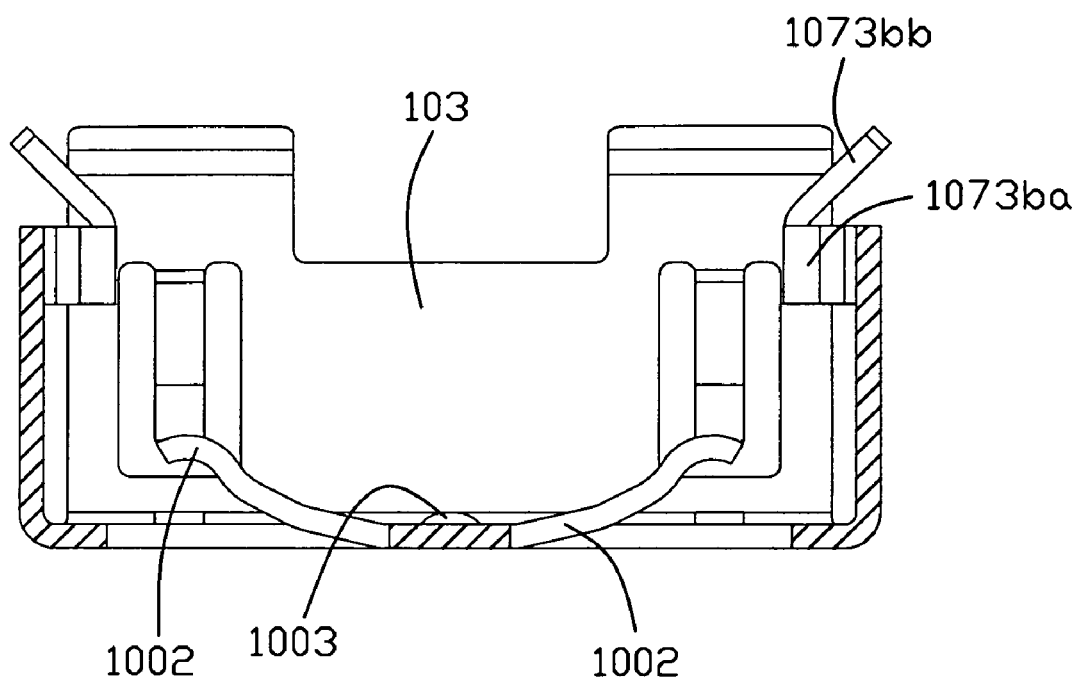
FIG. 4 is a sectional view of the shielded shell of FIG. 2.
Figure 5:
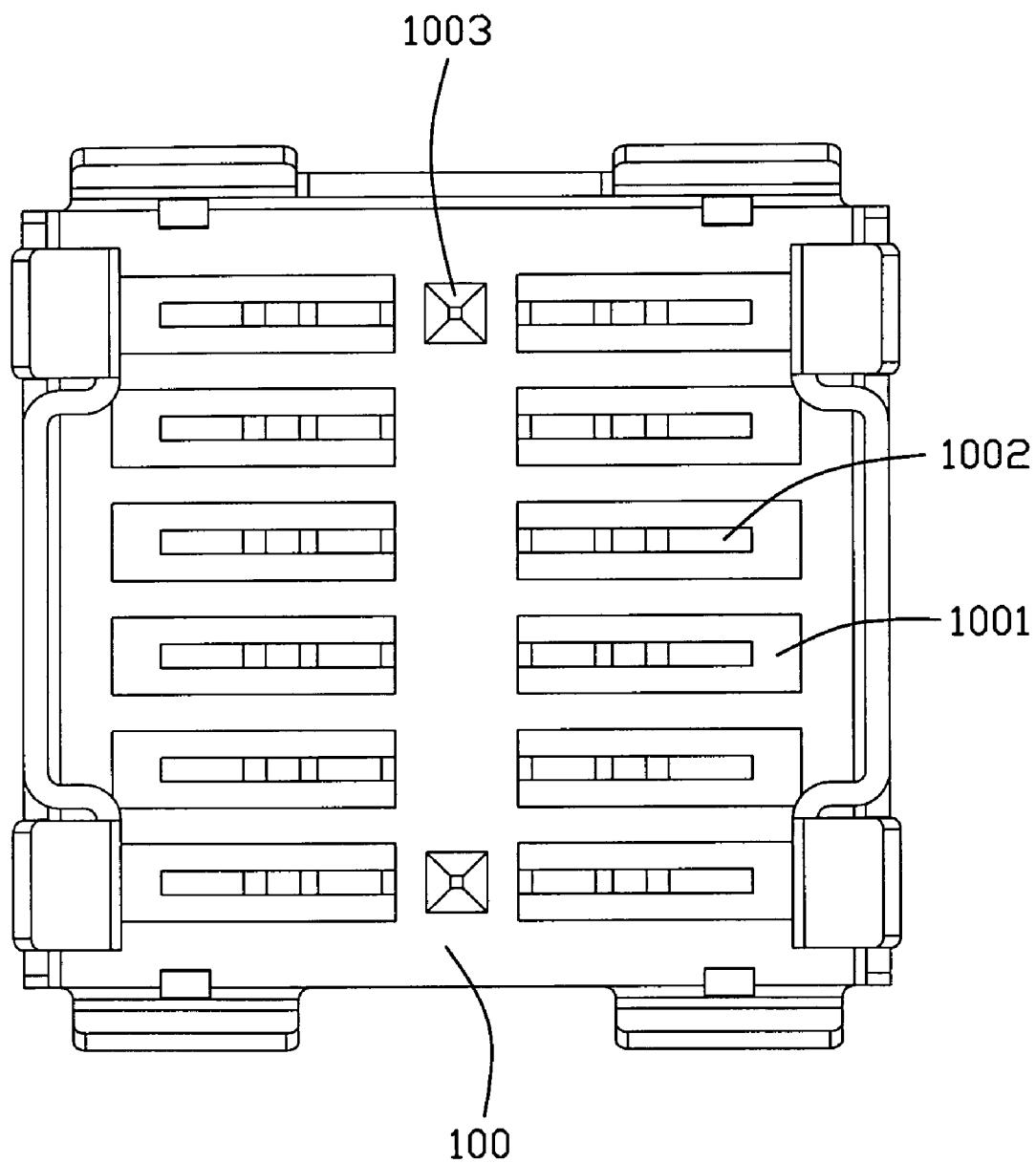
FIG. 5 is a top view of the shielded shell of FIG. 2.
Figure 6:
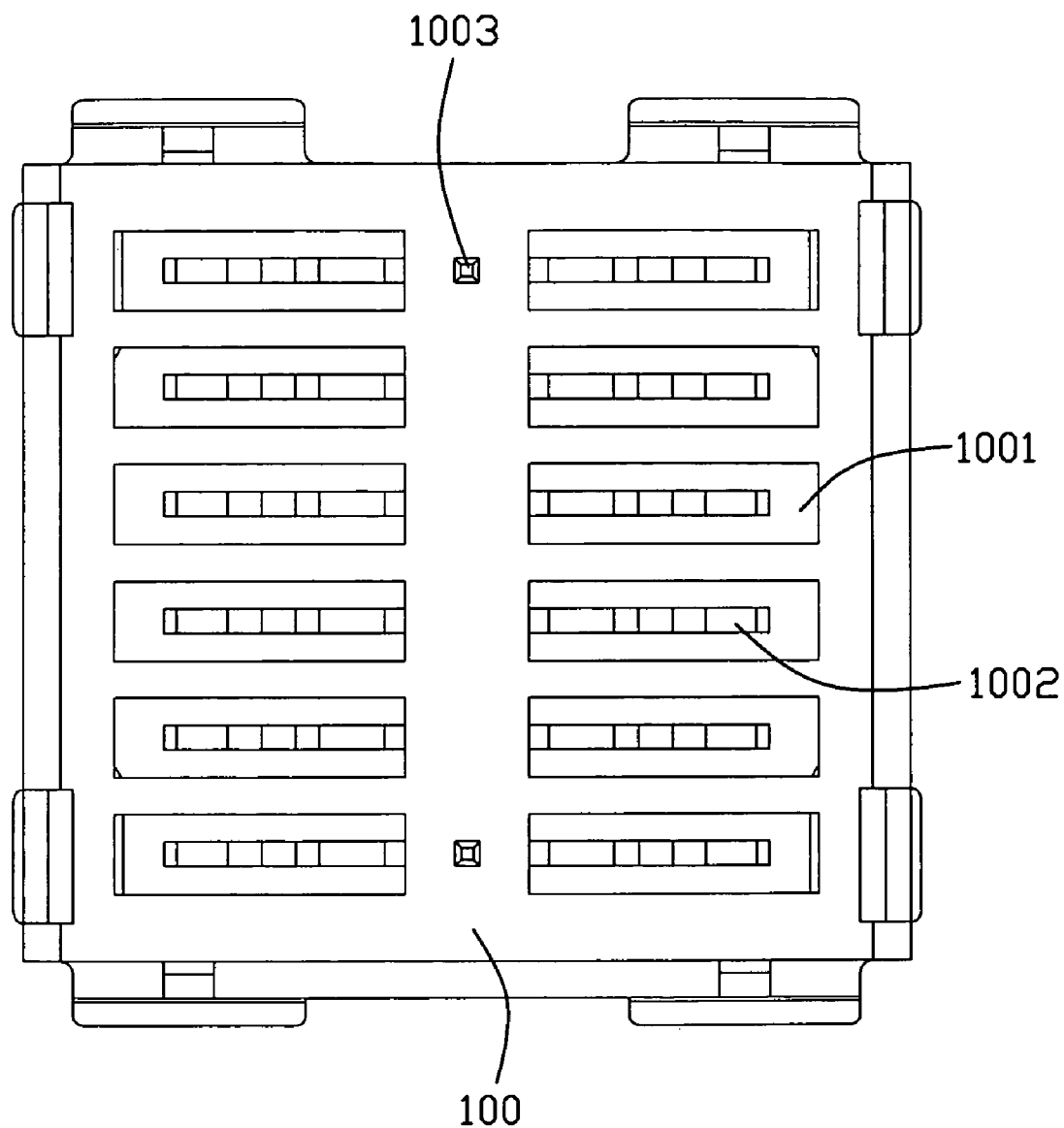
FIG. 6 is a bottom view of a shielded shell of FIG. 2.

FIG. 1 is a perspective view of the shielded shell according to the first embodiment of this invention in order to receive a camera module via a flexible printed circuit board. In the figures, the reference numeral 10 denotes a shielded shell made of a metal material. The reference numeral 2 denotes a flexible printed circuit board and the reference numeral 3 denotes a camera module.

The shielded shell 10 is made of metal material and configured by front wall 101, back wall 103, left wall 105, right wall 107 and a base wall 100 cooperatively defining a receiving space 109. Each front wall 101, back wall 103, left wall 105 and right wall 107 extends upwardly from the peripheral of the base wall 100 and the adjacent walls of the said walls did not connect each other so as to improve the elastic property of the shielded shell 10 and retain the camera module 3 better.

Each of the front and back wall 101, 103 defines a locking finger 1011 extending from the inner surface thereof to one of an opposite walls for holding the camera module 3 and the end of the locking finger 1011 smoothly curved inwardly in order to reduce the scraping to the camera module 3. Further more, the front wall 101 defines a window 1013 passing through the top thereof to the down so as to provide an electrical path for the flexible printed circuit board 2 passing through.

The left and right wall 105, 107 has the same structure and includes a fixed section 1071 and an elastic section 1073. The fixed section 1071 connects to the base wall 100 and the elastic section 1073 extends upwardly from the middle portion of the fixed section 1071, comprising a board portion 1073a connected to the fixed section 1071 and a pair of retaining portion 1073b extending from the two side ends of the board portion 1073a to an opposite wall. Each of the retaining portion 1073b defines a holding portion 1073ba vertical to the base wall 100 of the shielded shell 10 so as to against the peripheral of the camera module 3. A slant portion 1073bb is formed on the top end of the holding portion 1073ba and formed an angle with the holding portion 1073ba to lead the inserting of the camera module 3. And a connection portion 1073c is formed between the board portion 1073a and the retaining portion 1073b. Further more correspond to the slant portion 1073bb of the left and right wall 105, 107, the front and back wall 101, 103 defines a leading portion 1031 on the end thereof to guide the mounting of the camera module 3.

A middle portion 1000 is formed on middle area of the base wall 100 and extends from the back wall 103 to front wall 101. Two dimples 1003 are located on said middle portion 1000. A plurality of grooves 1001 are formed on the two sides of the middle portion 1000. The grooves 1001 take the middle portion 1000 as the axial symmetry. Each groove 1001 extends between the middle portion 1000 and the left/right wall 105/107. A plurality of fingers 1002 are formed on the base wall 100, each defining a contact portion 10021 to contact with the camera module 3 and extend from the edge of the groove 1001, near to the middle portion 1000, towards to the left/right wall 105/107 and disposed above the base wall 100. Each projection of the fingers 1002 is within the corresponding groove 1001 and the height of the finger 1002 is higher than the dimple 1003 thereof. Consequently, when the camera module 3 comes into contact with the fingers 1002 of the shielded shell 10, the pads (not shown) formed on the camera module 3 firstly contact with the fingers 1002, and the camera module 3 did not move downwardly until the bottom wall (not shown) of the camera module 3 contact with the dimple 1003 so as to prevent the fingers 1002 produce excess deforming.

The flexible printed circuit board 2 comprises a first section 21 receiving in the receiving space 109 and a second section 22 extending out from the receiving space 109 via the window 1013 of the shielded shell 10. The first section defines a plurality of electrical portion 211 separating each other corresponding to the contact portion 10021 of the fingers 1002 of the shielded shell 10. When the flexible printed circuit board 2 and the camera module 3 are inserted into the shielded shell 10 from above, said electrical portion 211 of the flexible printed circuit board 2 sandwiched by the fingers 1002 of the shielded shell 10 and the bottom wall of the camera module 3 firmly so as to provide a steady electrical connection between the camera module 3 and a printed circuit board (not shown). The second section 22 defines a plurality of electronic circuits (not shown) provided thereon in order to connect with a printed circuit board. Meanwhile, the first section 21 has an equivalent dimension with the receiving space 109 of the shielded shell 10 and the width of the second section 22 is smaller than that of first section 21 and equal to width of the window 1013 of the shielded shell 10. Therefore, when the flexible printed circuit board 2 assembled into the shielded shell 10, because the width of the first section 21 of the flexible circuit board 2 is wider than the width of the window 1013 of the shielded shell 10, the front wall 101 of the shielded shell 10 can prevent the flexible printed circuit board 2 been pushed out of the shielded shell 10, and the second section 22 disposed out of the receiving space 109 via the window 1013.

The camera module 3 comprises a base portion 31 which configured as a rectangular, a column portion 35 disposed on a top surface of the base portion 31, and a bottom portion 33. A strip 37 is formed on one side surface of the base portion 31 and extends to the peripheral of the column portion 35 so as to prevent the camera module 3 mismatchable assembling into the receiving space 109 of the shielded shell 10.

When assembly, firstly, the flexible printed circuit board 2 is mounted into the base wall 10 of the shielded shell 10 with the electrical portion 211 against the contact portion 1002a of the spring fingers 1002 one-to-one, at this moment the first section 21 of the flexible printed circuit board 2 is received in the receiving space 109 of the shielded shell 10 and the second section 22 thereof is coming out thereof via the window 1013; secondly, the camera module 3 is inserted into the receiving space 109 of the shielded shell 10 from above, during the process of the moving of the camera module 3, the spring fingers 1002 of the shielded shell 10 does not deform till the bottom wall of the camera module 3 is against with the dimple 1003 of the shielded shell 10. At this moment, the camera module 3 is completely fitted into the shielded shell 10 and the flexible printed circuit board 2 is sandwiched by the spring fingers 1002 of the shielded shell 10 and the camera module 3 firmly, meanwhile, the signal of the camera module 3 is transferred to the printed circuit board (not shown) via the flexible printed circuit board 2.

Figure 7:
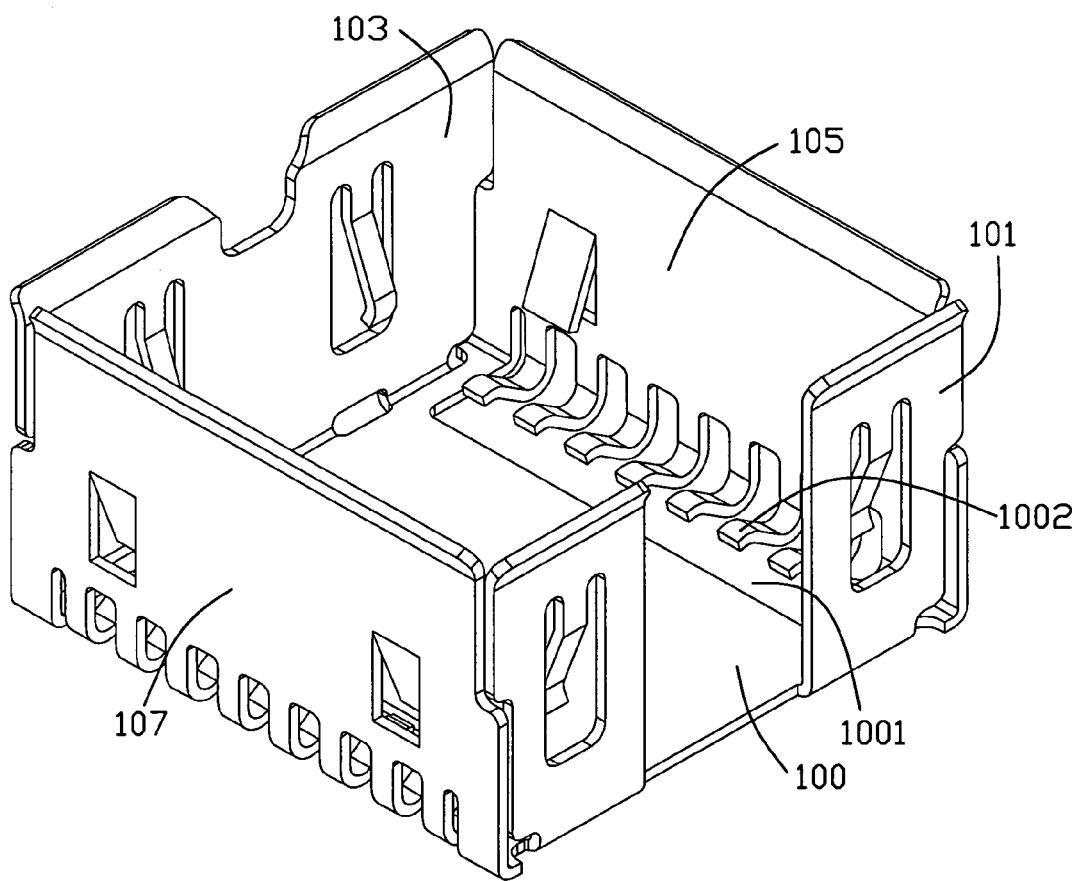
FIG. 7 is a perspective view of the shielded shell according to a second embodiment of the present invention.
Figure 8:
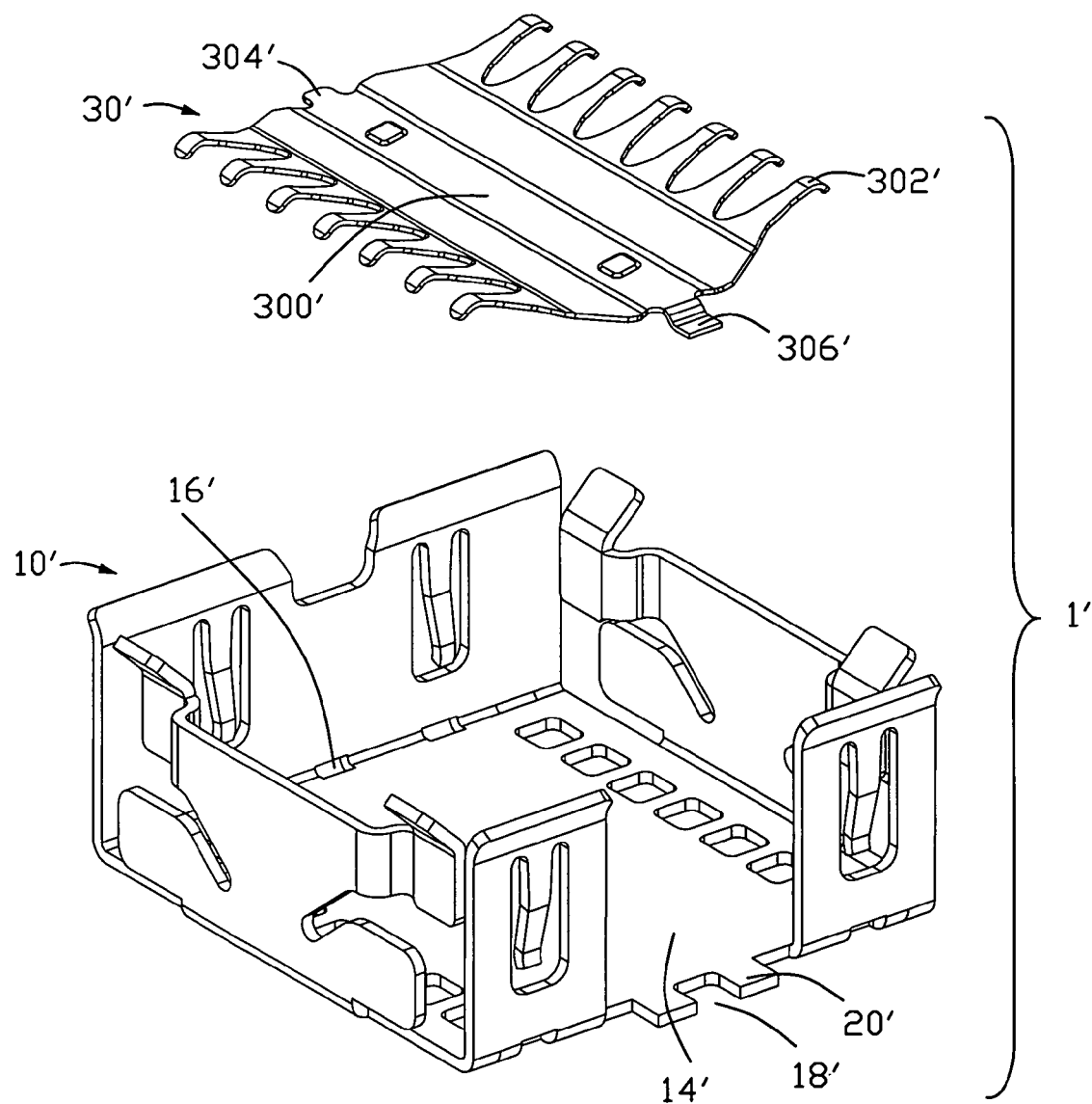
FIG. 8 is a perspective view of a traditional electrical connector, wherein the flexible printed circuit board and the camera module are not shown.

Please refer to the FIG. 7, it shows a shielded shell 10 according to a second embodiment of present invention. The detail construction is not description. Herein I only introduce the construction of the spring finger 1002. In FIG. 7, the spring fingers 1002 extend from an area near to the below end of the left or right wall 105, 107 towards the middle area of the base wall 100. Each finger 1002 disposed above the base wall 100 and a long opening 1001 is formed under the fingers 1002 and the width of the long opening 1001 is smaller than the half length between left and right walls 105, 107 of the shielded shell 10. Therefore, the spring finger 1002 arranged as two rows and extended face to face.

In the above description of the preferred embodiment, the spring fingers 1002 integrally formed on one of the base wall 1002 and side walls 101-107 of the shielded shell 10. Consequently, when assembly, it is only to put the flexible printed circuit board 2 and the camera module 3 into the receiving space 109 and it is not need to do the other assemble process. It can reduce the procedure of assembly and it is not easy that the spring finger 1002 and the shielded shell 10 are apart. A better electrical path is provided between the camera module 3 and the printed circuit board.

It is to be understood, however, that even though numerous, characteristics and advantages of the present invention have been set fourth in the foregoing description, together with details of the structure and function of the invention, the disclosed is illustrative only, and changes may be made in detail, especially in matters of number, shape, size, and arrangement of parts within the principles of the invention to the full extent indicated by the broad general meaning of the terms in which the appended claims are expressed.

What is claimed is:

1. A shielded shell for interconnecting a camera module to a printed circuit board via a flexible printed circuit board comprising:
   a base wall, a first, second, third, and fourth sidewall cooperatively defining a receiving space therebetween for receiving the camera module therein; and
   a plurality of spring fingers unitarily formed with one of the base wall and sidewalls and extending upwardly into the receiving space, wherein a plurality of grooves is formed on the base wall which extends from a middle area of the base wall towards a sidewall and the spring fingers extend from an edge of the grooves towards the other edge thereof, wherein said grooves extend from the middle area thereof to a sidewall but not reach to the edge thereof, wherein projection of each spring finger is within the corresponding groove, wherein at least a dimple is located on the middle area of the base wall and not on the area which the spring finger located, meanwhile, the height of the dimple is lower than the vertex of the spring finger, wherein the third and fourth wall has the same structure, each comprising a fixed section and an elastic section, wherein the elastic section extending upwardly from the middle position of the fixed section comprises a board portion and a pair of retaining portions disposed on the two end sides of the board portion which extends towards an opposite sidewall for against the out surface of the camera module, wherein a window is formed on one of sidewalls for provide a path the printed circuit board passing through, wherein the spring fingers arrange as two rows and extend from one of sidewalls to an opposite sidewall, wherein a long opening is defined on the base wall which the width thereof is smaller than a half of that length of a corresponding sidewalls and projection of the all spring fingers is within the opening.

2. An electrical connector assembly comprising: a metallic shell including a base plate and four side plates commonly defining a receiving cavity thereamong; a camera module received in said receiving cavity; two of said four side plates each providing a releasable retaining portion with a slant portion thereon for downwardly holding said camera module; the other two of said four side plates each providing locking finger for transversely holding said camera module in said receiving cavity; and a plurality of spring contact portions unitarily stamped and extending from a primary body of the base plate; and a flexible printed circuit (FPC) sandwiched between the camera socket and the base plate; wherein said FPC defines a main body with a plurality of plurality of spaced flexible electrical portions with conductors thereon under a condition that each of said spring contact portions extends away from the primary body in a first direction which is identical to that along which the corresponding one of said flexible electrical portion extends; wherein said spring contact portions extend from a central region of the primary body, and said flexible electrical portions also extend from a central area of the main body; wherein the spring contact portions are arranged with two rows and extend toward the corresponding opposite two of said four side plates; wherein a plurality of grooves is formed under the spring contact portions and a projection of each spring contact portion is located within the corresponding grooves; wherein one of said four side plate, which is located between said corresponding opposite two of said four side plates, defines a window through with FPC passes.

3. The electrical connector assembly as claimed in claim 2, wherein said spring fingers extend from a central region of the primary body, and said flexible electrical portions also extend from a central area of the main body.

* * * * *